United States Patent [19]
Desjardins et al.

[11] Patent Number: 5,853,589
[45] Date of Patent: Dec. 29, 1998

[54] ADVANCED BIOLOGICAL PHOSPHORUS REMOVAL USING A SERIES OF SEQUENCING BATCH REACTORS

[75] Inventors: Gaétan Desjardins, Repentigny; Yves Comeau, Laval; Gino Bélanger, Montreal, all of Canada

[73] Assignee: ECO Equipment Fep, Inc., Quebec, Canada

[21] Appl. No.: 869,420

[22] Filed: Jun. 4, 1997

Related U.S. Application Data

[60] Provisional application No. 60/019,175 Jun. 5, 1996.
[51] Int. Cl.$^6$ .................................................. C02F 3/30
[52] U.S. Cl. .................... 210/605; 210/614; 210/622; 210/624; 210/630; 210/906; 210/921
[58] Field of Search ...................... 210/605, 609, 210/614, 616, 617, 622, 623, 624, 625, 626, 629, 630, 903, 921, 906

[56] References Cited

U.S. PATENT DOCUMENTS

| | | | |
|---|---|---|---|
| 5,013,441 | 5/1991 | Goronszy | 210/605 |
| 5,182,021 | 1/1993 | Spector | 210/605 |
| 5,228,996 | 7/1993 | Lansdell | 210/605 |
| 5,266,200 | 11/1993 | Reid | 210/605 |
| 5,304,308 | 4/1994 | Tsumura et al. | 21/614 |
| 5,354,471 | 10/1994 | Timpany et al. | 210/629 |
| 5,395,527 | 3/1995 | Desjardins | 210/629 |
| 5,514,277 | 5/1996 | Khudenko | 210/605 |
| 5,525,231 | 6/1996 | Ho et al. | 210/629 |

OTHER PUBLICATIONS

"Use of a New Anaerobic–Aerobic SBR System to Enhance Biological Phosphorus Removal", Authors: Shahnaz Danesh and Jan A. Oleskiewicz, Publ.: Department of Civil and Geological Engineering, University of Manitoba, 15 Gillson Street, Winnepeg, Manitoba, R3T 5V6, Canada.

Dr. Yves Comeau, Publ.: Sciences et Techcniques de l'eau, vol. 23, No. 2, May 1990 edition.

*Primary Examiner*—Thomas G. Wyse
*Attorney, Agent, or Firm*—Pepper Hamilton LLP

[57] ABSTRACT

The biological process is for treating wastewater in order to remove the phosphorus therefrom and thus obtain clarified water. The process is using two sequencing batch reactors (SBR) in series filled with a sludge-mixed liquor. The process consists of: continuously feeding wastewater into the first (SBR) operating under anaerobic conditions for equalization and anaerobic treatment by controlling in-time any fermentation reaction occurring therein in order to produce an acidogenesis fermenting phase of organic materials and prevent the methanogenesis phase. Then, the fermented wastewater from the first SBR is rapidly transferred by batch into the second SBR. In the second SBR, the wastewater is first anaerobically treated to store a maximum amount of volatile fatty acids (VFAs) in the phosphorus removal biomass. Then, the fermented wastewater is mixed and aerated for causing the phosphorus removal biomass to rapidly consume the volatile fatty acids stored therein and to absorb the phosphorus in solution in the wastewater, thereby producing a phosphorus-rich sludge-mixed liquor. Then, the phosphorus-rich sludge-mixed liquor is removed under oxygenated conditions to avoid resolubilization of the phosphorus in the water. The sludge remaining in the second SBR is allowed to settle, thereby causing formation of an upper layer of clarified water. Finally, the upper layer of clarified water is decanted. The clarified water obtained contains a low concentration of phosphorus, preferably less than 0,5 mg/l of phosphorus in solution.

12 Claims, 7 Drawing Sheets

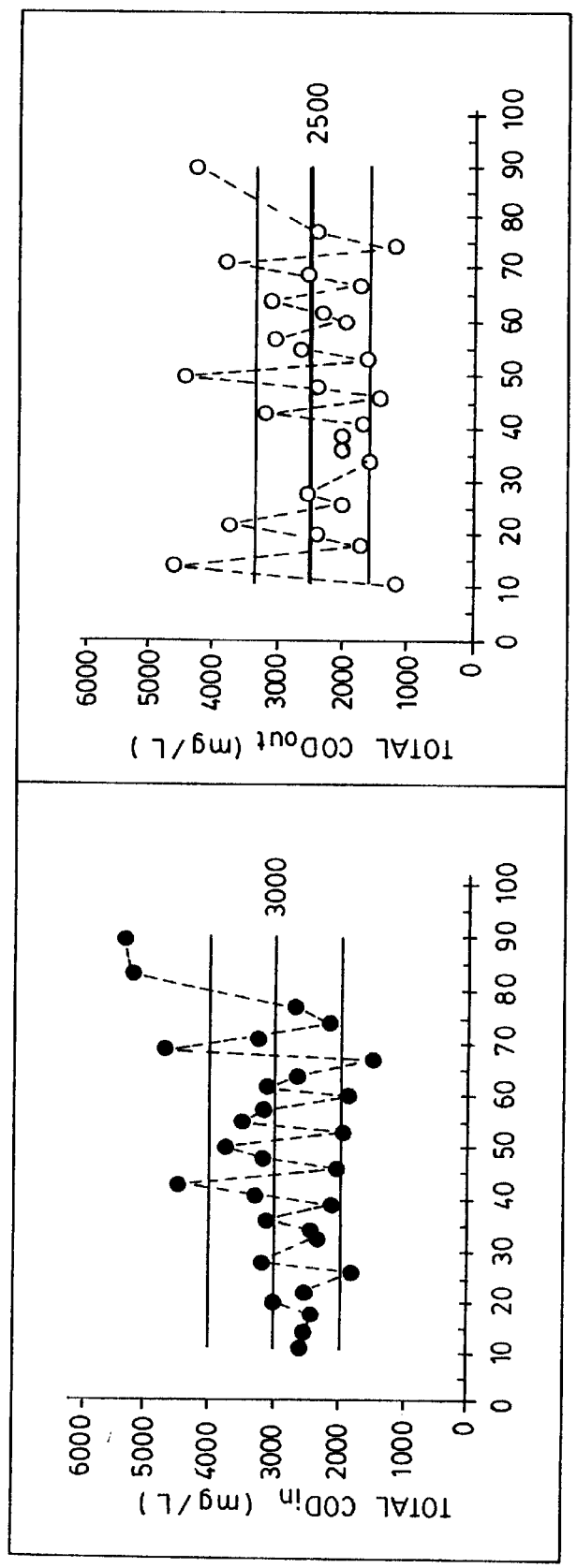

ADVANCED BIOLOGICAL PHOSPHORUS REMOVAL USING A SERIES OF SEQUENCING BATCH REACTORS

RELATED APPLICATIONS

This application claims priority from provisional patent application Ser. No. 60/019,175, filed Jun. 5, 1996, entitled "ADVANCED BIOLOGICAL PHOSPHORUS REMOVAL USING A SERIES OF SEQUENCING BATCH REACTORS", which is incorporated herein by reference.

BACKGROUND OF THE INVENTION

1. Field of the Invention

The present invention relates to a process for treating biodegradable wastewater. More particularly, it relates to a biological process using at least two sequencing batch reactors (hereinafter called SBR) for treating wastewater and obtaining clarified water having a low concentration of phosphorus, preferably less than 0.5 mg/l of phosphorus in solution.

2. Brief Description of the Prior Art 2.1. Increasing demand for the elimination of phosphorus from treated wastewater During the last decades, all environmental agencies have taken a serious look at the increasing pollution aspect of all surface water due to the "phenomenon of eutrophication". This serious phenomenon of pollution is caused by the uncontrolled proliferation of different algae and plant species in the lakes and rivers. Numerous studies have proven the origin and the causes of such proliferation of this vegetative type of pollutant. Plants and algae will develop and continue to grow where all their basic living conditions are satisfied in terms of the presence of light to complete their photosynthesis and the presence of basic nutrients such as ammonia and phosphorus.

For many years, scientists and engineers have attempted to control eutrophication by reducing the ammonia level at the discharge of the wastewater treatment plants. This was done using different technologies such as nitrification and denitrification and regular activated sludge plants and other processes such as ammonia stripping with pH adjustment and aeration.

Nowadays, more and more scientists and engineers recognize that control over ammonia is not very efficient in eliminating plant and algae proliferation due to the fact that several microbial species can use nitrogen gas as a source of nitrogen for cellular synthesis. Air consists of approximately 80% of nitrogen gas.

Therefore, it has become clear that this simple solution would not work satisfactorily and that eutrophication has to be controlled using a more sophisticated technology aiming at reducing the phosphorus content from the discharge of wastewater treatment plants. In other words, phosphorus is now recognized as the "key" nutrient to control eutrophication in most freshwater bodies.

2.2. State of the Art

Several attempts to reduce the phosphorus content of wastewater have been made over the last decades using different technologies. The following is a summary of these different techniques and applications.

Chemical Precipitation

So far, chemical precipitation is the best-known and proven technology to reduce phosphorus to a concentration of 1.0 mg/l and even less. Such precipitation is normally achieved using metallic salts such as alum and ferric chloride. The main advantages of this process are that it is simple to control and that it performs satisfactorily as long as effluent standards are not any lower than 1.0 mg/l as total phosphorus.

With effluent total phosphorus standards in the 0.4–0.5 mg/l range, several disadvantages of this chemical approach are significantly emphasized:

major overdosing of chemicals is needed to reach low effluent phosphorus standards, which generate a number of problems such as the cost of chemicals, the production of chemical sludges (sometimes of a hazardous nature) to be disposed of, the introduction of unreacted metallic salts in the treated effluent, and a significant drop in the pH of the treated water which can have a detrimental impact on the biological process and/or biological life of the receiving body of water;

the use of tertiary sand filters or of improved dynamic clarifiers becomes essential as such quantities of metallic salts create high turbidity and a high level of suspended solids that have to be physically removed from the water.

Thus, chemical precipitation has become quite an expensive operation. It introduces other concerns about the quality of the treated water and increases the problem of dealing with enhanced quantities of chemical sludge. For all these reasons, chemical precipitation is being regarded as "not so environmental anymore".

Biological Chemically Assisted Processes

Since the 1960's, several processes were established and marketed to remove phosphorus using conventional activated sludge processes in conjunction with a fatty acids generation through diverse fermenting processes. An article published by one of the inventors, Dr. Yves Comeau, P.Eng., summarizes the different attempts in this field. The article was published in *Sciences et Techniques de l'eau*, Volume 23, number 2, May 1990 edition. These processes often necessitate a chemical precipitation assistance to meet the modern phosphorus effluent requirements limits consistently.

Biological Phosphorus Removal Processes

In the 1970's, numerous new processes were proposed in an attempt to deal more efficiently with biological phosphorus removal. Most of these techniques utilize anoxic conditions for denitrification to take place prior to the aerated biological reactor. Others have introduced an additional anaerobic reactor ahead of the anoxic zone. Several configurations of anaerobic, anoxic and aerobic reactors are also reported in the above-mentioned article by Dr. Yves Comeau, P.Eng. Some of them use different sludge return modes. However, all of them use a continuous flow activated sludge system.

Fill and Draw Sequencing Batch Reactor Systems

In the same article, Dr. Yves Comeau, P.Eng. also reported another technology capable of removing phosphorus using biological means. This technology was experimented since 1978. It consists of treating the wastewater by "batches" instead of by a "continuous flow system". This Sequencing Batch Reactor (SBR) process also utilizes activated sludge technology. The main advantage of this technology is that it offers a reactor that can be easily controlled "in-time" during an engineered sequence period elaborated to satisfy specific effluent standards in terms of carbon, nitrogen and phosphorus removal.

By varying the time duration of each anaerobic, anoxic and aerobic period of a given sequence, the biological reactions can then be modified and controlled using an order of priority. Each of these reactions can be adjusted for any given time period necessary to achieve the specified treatment level. However the process reported by Dr. Comeau does not permit to systematically obtain a concentration of phosphorus in solution lower than 0,5 mg/l without the assistance of chemical precipitation.

Phosphorus Removal Using Trickling Filter or Biofilter Technology

Another technology of the "trickling filter" and of the biofilter type has been developed over the last five years. This technology is completely different from the present invention which does not use trickling or biological filtration.

Bio-Denitro/Bio-Denipho Process

Another process utilizing oxidation ditches technology has been reported and marketed to biologically remove the phosphorus content of wastewater. In this process, at least two ditches are used with or without an additional anaerobic zone. The ditches are connected in series. One ditch is alternatively and intermittently used as a clarification zone. This clarification zone and the influent introduction are alternated between the two ditches to distribute the sludge equally. However, this technology does not allow to consistently obtain an effluent phosphorus concentration of 0.5 mgP/l (total phosphorus) without the assistance of chemical precipitation using metallic salts (Al, Fe or Ca) or without tertiary filtration unless the wastewater shows very favorable characteristics.

Therefore, there is presently a need for a biological wastewater treatment process, for treating either municipal or industrial wastewater, that would be able to consistently reduce the effluent phosphorus concentration phosphorus without the assistance of chemical precipitation using metallic salts (Al, Fe or Ca) and without tertiary filtration.

SUMMARY OF THE INVENTION

The object of the present invention is to provide a process which satisfies this need.

More precisely, the present invention provides a biological process for treating wastewater in order to obtain an effluent having a low concentration of phosphorus in solution, preferably an effluent containing less than 0,5 mg/l of phosphorus. This process uses at least two sequencing batch reactors (SBR) filled with a sludge-mixed liquor and comprises the steps of:

a) continuously feeding the wastewater into a first SBR operating under anaerobic conditions;

b) in the first SBR,
   i) equalizing and anaerobically mixing the wastewater;
   ii) controlling in-time any fermentation reaction occurring therein in order to produce and maximize an acidogenesis fermenting phase of organic materials and prevent a methanogenesis fermenting phase thereof.

c) rapidly transferring the wastewater from the first SBR to a second SBR;

d) in the second SBR,
   i) anaerobically treating the wastewater from the first SBR in order to store a maximum amount of volatile fatty acids (VFAs) within a phosphorus removal biomass;
   ii) then mixing and aerating the wastewater such aerating causing the phosphorus removal biomass to rapidly consume the VFAs stored therein and to absorb the phosphorus in solution in the wastewater, thereby producing a phosphorusrich sludge-mixed liquor;

iii) removing a given amount of the phosphorus-rich sludge-mixed liquor from the second SBR under oxygenated conditions to avoid resolubilization of the phosphorus in the water;
   iv) allowing the sludge remaining in the second SBR to settle, thereby causing formation of an upper layer of clarified water; and
   v) decanting the upper layer of clarified water formed above the mixed liquor after the settling period, the clarified water containing a low concentration of phosphorus, preferably less than 0,5 mg/l of phosphorus in solution.

Preferably, the process according to the invention may comprise the additional step of:

b) iii) allowing the sludge to settle in the first SBR before transferring the wastewater to the second SBR.

Preferably also, the process may further comprise the additional steps of:

e) filtering the removed sludge-mixed liquor by using a micronic filtration process to obtain a filtrate and a thickened sludge;

f) adding the filtrate to the first or second SBR;

g) treating the thickened sludge in an aerated sludge holding tank; and h) dewatering the treated sludge.

As can be understood, the process according to the invention makes use of at least two SBR to treat biodegradable wastewater in order to greatly lower the effluent phosphorus concentration. It is able to reduce the phosphorus concentration of municipal and industrial wastewater down to levels judged acceptable for receiving water bodies by environmental biologists. Advantageously, this process also uses exclusively biologically-mediated means excluding chemical additives to meet such effluent requirements.

Preferably also, the process according to the invention may cover every aspect beginning with early prefermentation of the organics in an equalization tank and including all biologically controlled reactions, wastewater transfer methodology from a first anaerobic SBR to a second SBR, excess sludge removal methodology, and finally, a rapid thickening and dewatering of the phosphorus-rich (P-rich) sludge.

The process according to the invention can be used to treat any kind of biodegradable wastewater where toxicity levels are minimal and/or cannot affect the operation of a biomass when subjected to a "Rapid-Feed/Full-Batch" (RFB) transfer operation of each volume from a first anaerobic SBR to a final SBR operating in series.

Thus, this process is particularly suitable for the treatment of domestic wastewater, or in the food industry in general, or in the chemical and petroleum, pulp and paper industries, where the toxicity is minimum or can be pretreated so that it is not detrimental to a biological process as described.

BRIEF DESCRIPTION OF THE DRAWINGS

The invention and the way it works will be better understood upon reading of the following, more detailed but non-restrictive description thereof, given with reference to the accompanying drawings in which.

DETAILED DESCRIPTION OF THE INVENTION

Figure 1:
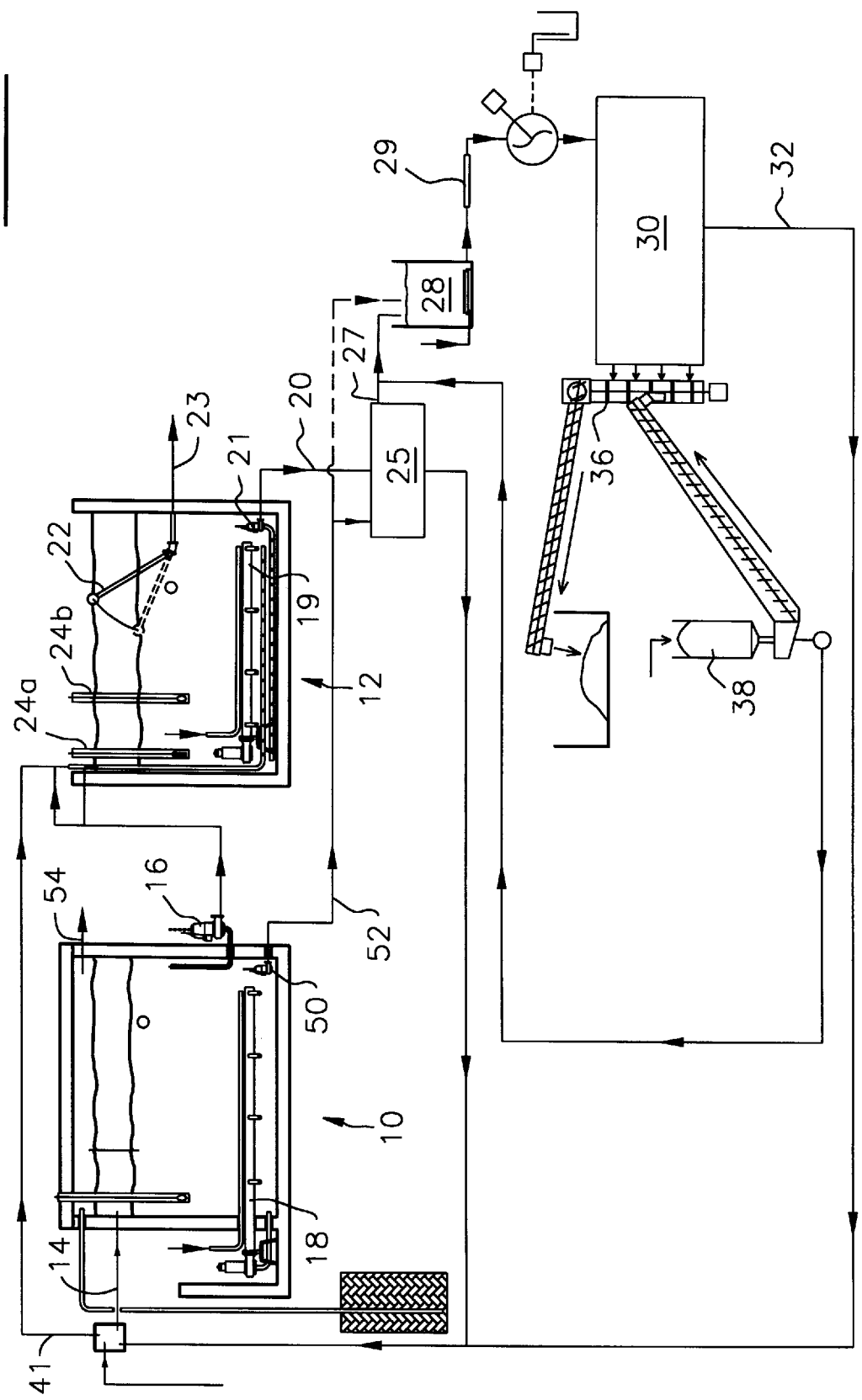
FIG. 1 is a schematic representation of a first preferred embodiment of a wastewater treatment system adapted to carry out the process according to the invention.
Figure 2:
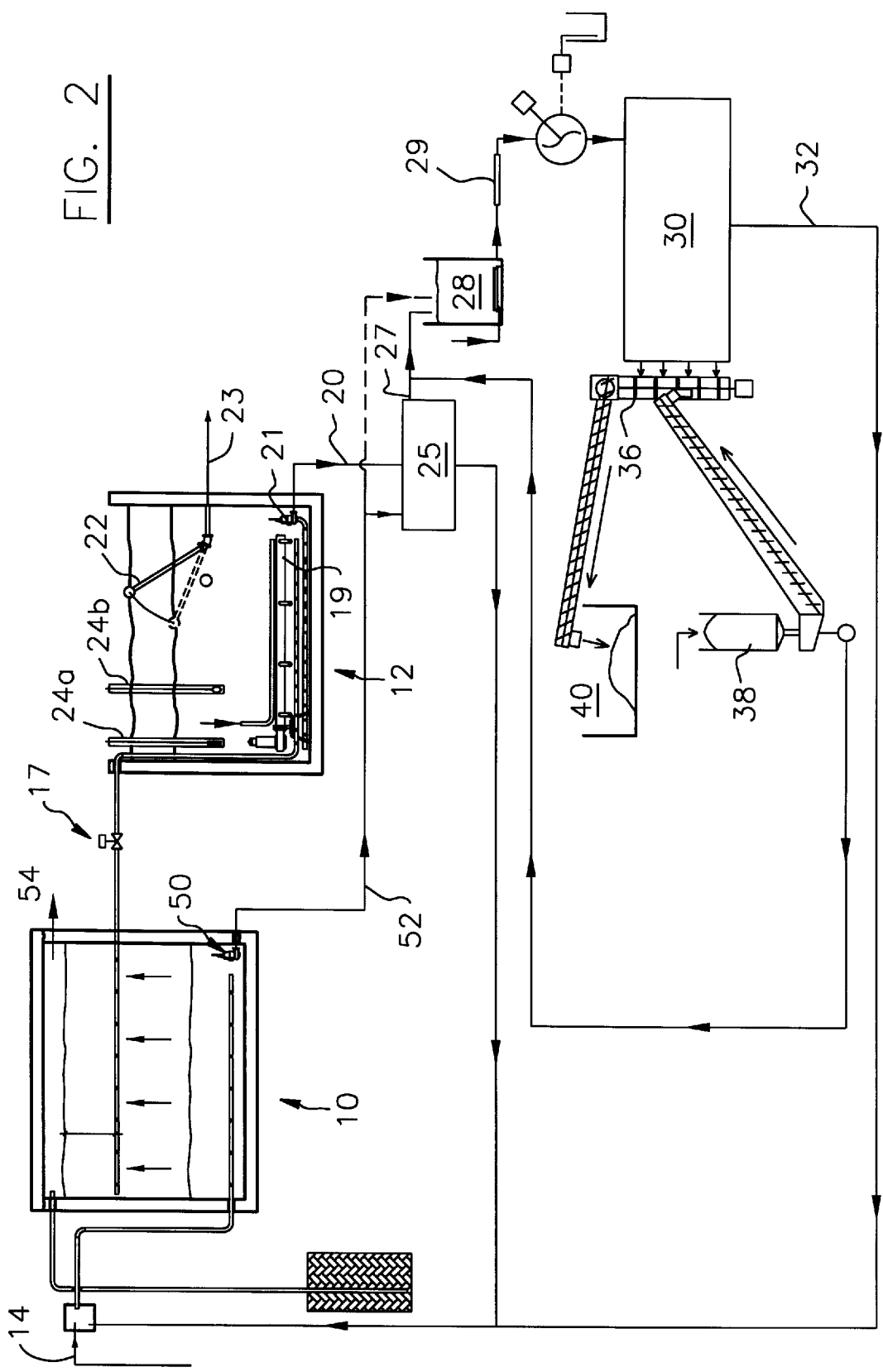
FIG. 2 is a schematic representation of a second preferred embodiment of a wastewater treatment system adapted to carry out the process according to the invention.
Figures 3C, 3D:
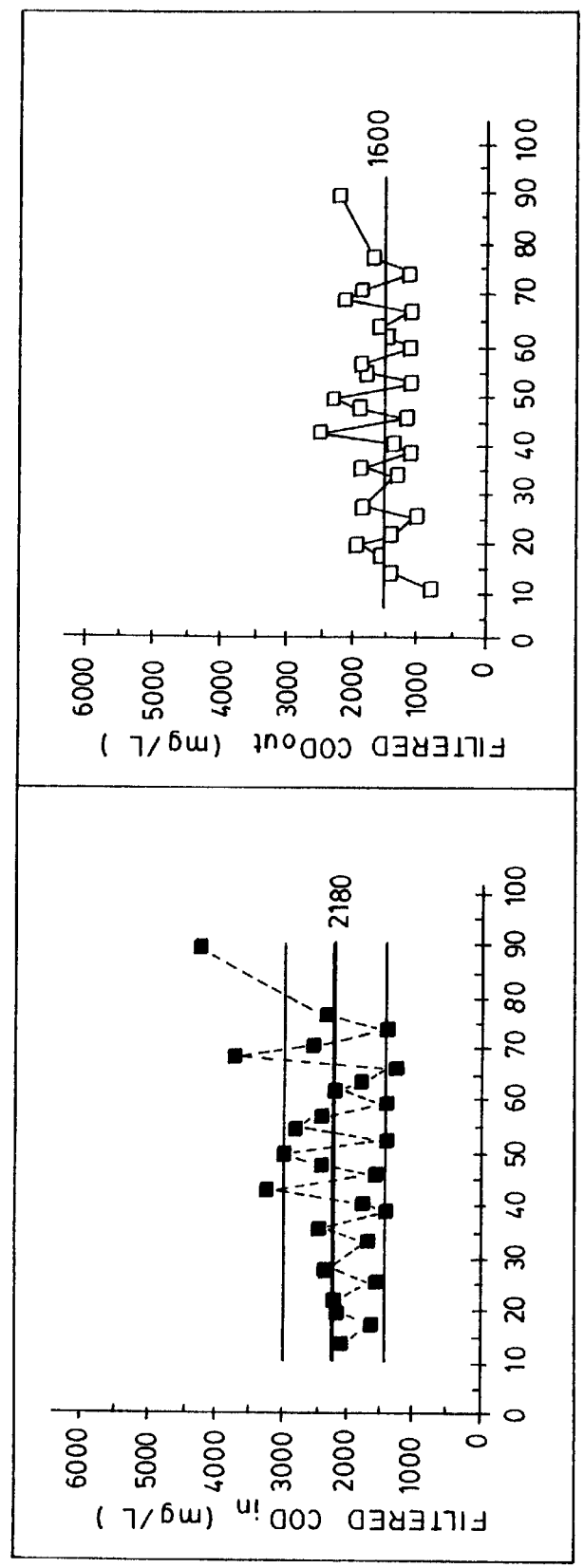
FIG. 3 is a plot diagram showing the VFAs production of a pilot-scale pilot first SBR treating an industrial milk plan effluent.
Figures 3E, 3F:
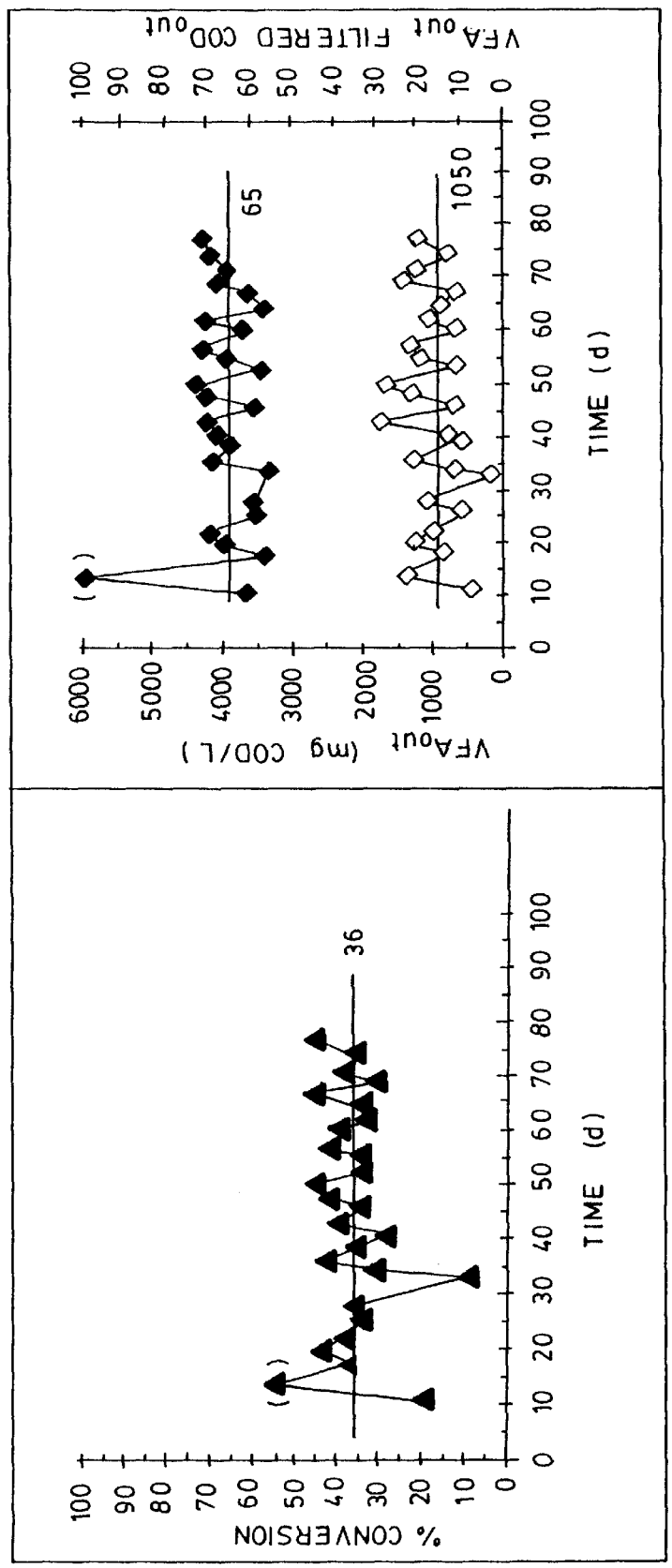

Referring to FIGS. 1 and 2, the process according to the invention uses two sequencing batch reactors (SBR) in series, a first anaerobic SBR (10) and a second oxic SBR (12)

The untreated raw wastewater influent (14), after optional pre-screening and grit removal, is fed continuously into the first SBR (10) by pumping, as in FIG. 1, or by gravity, as in FIG. 2. The mode of operation of this first SBR (10) is distinct from the second SBR (12), in that its influent is continuous and its discharge is intermittent. The first SBR (10) is strictly anaerobic, since its functions are restricted to equalization and prefermentation of the soluble and particular organic material present in the influent wastewater. This first SBR (10) performs the following functions:

hydraulic flow equalization;
fermentation of organic material;
storage of a sufficient wastewater volume to "batch-feed"the second SBR (12) using a combination of hydraulic heads and valves, as in FIG. 2, or preferably, using feed pumps, as in FIG. 1.

More particularly, in the first SBR (10), the wastewater is equalized and anaerobically mixed. This mixing provides the necessary contact between the fermenting biomass and the carbonaceous load, by using a hydraulic jet (18). Any other type of hydraulic circulation means known in the art, which excludes air/oxygen introduction such as mechanical downflow, horizontal turbine mixers, may alternatively be used for anaerobically mixing the wastewater. The preferred embodiment of the process illustrated in FIG. 1 utilizes a "complete-mix fermenter" which utilizes a mechanical means for suspending the fermentative biomass hydraulically without assistance from any aeration device.

In another preferred embodiment, illustrated in FIG. 2, the process also offers a version based on an expanded sludge bed fermenter configuration rather than complete-mix as described above. In this embodiment, the contact between the organics and the fermentative biomass is only provided by the influent wastewater energy as it is forced and distributed uniformity from the bottom of the fermenter. The whole fermenter is then designed as a primary clarifier i.e. with sufficient area to allow efficient removal of suspended solids. This preferred embodiment is to be used on wastewaters containing lower phosphorus concentration to be removed. Because of a lower contact intensity between the fermentative biomass and the raw organics included in the wastewater, a lower efficiency as far as VFAs generation is observed in the first SBR (10).

The fermentation reactions occurring in the first SBR (10) are controlled in-time in order to cause acidogenesis fermentation (also called "first fermentation phase") of the organic material.

Preferably, sizing of the first SBR (10) allows for a hydraulic retention time (HRT) ranging from 2 to 24 hours, more preferably from 6 to 15 and most preferably from 8 to 12 hours.

Preferably also, prior to transferring the wastewater to the second SBR (12), the sludge is allowed to settle in the first SBR (10).

As soon as the organic content is well fermented in the first SBR (10), and before that methanogenesis, also called "second fermenting phase" of the anaerobic digestion, starts to occur, the wastewater is rapidly transferred, preferably in 15 to 60 minutes, from the first SBR (10) to the second SBR (12), using a feed pump (16) as in FIG. 1 or necessary hydraulic head (17), as in FIG. 2.

Because the wastewater including soluble fermented organics is rapidly transferred by batches from the first SBR (10) into the second SBR (12) in a "rapid-feed mode", all significant reactions in the second SBR (12) start when the reactor is being filled. In this sense, no "aerated-fill" period is utilized even during peak flow periods. The second SBR reactor (12) is meant to operate as a reactor where anoxic, anaerobic and aerobic periods are utilized in each of the treatment cycles.

The initial non-aerated period is controlled in-time to allow the maximum amount of VFAs to be stored within the biological phosphorus removal biomass. Phosphorus is released from the biomass to release energy for this VFA storage.

Another sequence in this second SBR (12) consists of mixing and aerating the fermented wastewater. Such aerating causes the biological phosphorus biomass to rapidly consume the VFAs stored therein and to absorb the phosphorus in solution in the wastewater, thereby producing a phosphorus-rich sludge-mixed liquor. Any type of mixing device such as a hydraulic jet mixer (19) as is illustrated may be used for mixing the wastewater in the second SBR (12). A given amount, more preferably a maximum amount, of phosphorus-rich sludge-mixed liquor is then removed from the second SBR (12) under highly oxygenated conditions, as a waste activated sludge (20), to avoid resolubilization of the phosphorus in the water. The waste activated sludge (20) is removed from the second SBR (12) simply by using a conventional pump (21).

The remaining sludge in the second SBR (12) is then allowed to settle, thereby causing formation of an upper layer of clarified water having a low phosphorus concentration. This upper layer of clarified water is then decanted, preferably with a floating decanter (22), to obtain a treated effluent (23) of water.

The treated effluent of municipal wastewater may preferably contain at most 0,5 mg/l of phosphorus in solution. According to the present process, it is possible to lower the phosphorus concentration of an influent of wastewater containing as much as 80 mg/l of phosphorus, such as industrial wastewater, to a phosphorus concentration of at most 20 mg/l and preferably 5 mg/l, without using any chemical reaction.

The operations of the first and second SBR (10,12) are preferably controlled by a common logic controller whereas all hydraulic physical and biological functions will be addressed and controlled so that improved biological phosphorus removal can be achieved on a permanent basis without the need of chemical precipitation and/or physical tertiary filtration. All the physical and biological properties of the wastewater either in the first or the second SBR may be tested with conventional level probes (24a). The water levels may also be obtained with conventional level probes (24b).

Preferably, as illustrated in FIGS. 1 and 2, the waste activated sludge (20) is then filtered preferably using a micronic filtration equipment (25) or alternatively separated using dissolved air flottation apparatus. The filtrate (26) obtained is then fed to the first (10) or second SBR (12) and the thickened sludge (27) is transferred into an aerated sludge holding tank (28) feeding a variable flow sludge pump (29) towards a final sludge dewatering apparatus (30) to be dewatered. The water effluent (32) obtained from the dewatering process may be added to the first SBR (10) or second (12) for further treatment. The thickened phosphorus sludge (34) obtained from the dewatering process may be transferred to a paddle mixer (36) where it is stabilized with lime (38) (if required) before being transferred to a sludge receiving tank (40).

MORE DETAILED DESCRIPTION OF THE SUCCESSIVE STEPS AND REACTIONS OF THE PROCESS ACCORDING TO THE INVENTION

1. First SBR (anaerobic)

As mentioned hereinbefore, the first SBR (10) is a time-controlled anaerobic SBR. It offers control over the nature or the quality of the organics available to the biomass during the treatment process. Two major functions are so realized: equalization and fermentation.

1.1 Equalization Functions

All the flow is equalized ahead of the second SBR (12) in the first anaerobic SBR (10) so that significant time is gained to allow for the biological reactions to occur, including a more efficient physical separation of the biomass with very little suspended solids.

It is noted that the prior art SBR technology has been mostly addressing hydraulic difficulties by trying to treat a continuous influent into intermittent batches. In this sense, very little attention was given to the biological process as the flow conditions had to have priority in all cases. The present invention is conscientiously adding one more reactor to the process as it recognizes the need to give priority to biological functions over hydraulic function in order to achieve more advanced biological treatment including more efficient biological phosphorus removal.

Also, over the years, the SBR technology has been more directed towards savings on the civil works to the point where the so-called SBR process is no more a real batch process but rather is a continuous flow system where the last area of the reactor is simply baffled to allow effluent clarification and the localization of a decanter device. In such case, the "batch process", where the first inherent advantage is to enable "time control over each biological reaction", becomes very limited and almost inexistent as the process is in fact controlled "in-space"rather than "in-time".

Many of the known processes such as the "continuous flow intermittent discharge processes" or "modified SBR processes", are in fact using a "disguised plug flow/activated sludge reactor" with internal decantation means provided at the effluent end of their biological reactor. Again, these processes serve well in cutting the civil works costs but their principle of operation is not designed to deeply address nutrient removal and particularly biological phosphorus removal.

By adding such a first SBR (10) ahead of a rapid-fill/full-batch SBR technology, the present invention is preferably providing a 2 to 24 hours retention time calculated on the average daily flow. More preferably, the size of the first anaerobic SBR (10) will be selected to provide from 8 to 12 hours retention time so that adequate hydraulic equalization is provided along with adequate reaction time for the fermentative biomass present in this SBR (10). Smaller tankage will translate into shortage in equalization capacity and also less adequate capacity to generate sufficient fermentative reaction to provide a stable process. Larger tankage will translate into additional costs and also into a deterioration of the fermentation products; the volatile fatty acid compounds (the end product of the fermentative biomass) will then be consumed by the methanogenic biomass as the anaerobic process will fall into its second stage, methanogenesis. This stage must be avoided in order to maximize VFAs production and achieve the best possible biological phosphorus removal in the second SBR (12).

The first anaerobic SBR (10) is not limited to a 24 hours retention time. In fact, its actual volume may be increased to reflect particular equalization requirements of a given application such as municipal application with water infiltration.

For industrial applications where the typical ratio of biodegradable carbon to the actual daily flow remains high, the process according to the invention intends to treat all the incoming wastewater through the equalization/fermentor SBR reactor. In these cases, the high organic load calls for a longer hydraulic retention time for the fermentation process. Such retention times are then easy to match with the necessary hydraulic time for equalization for a given application.

For municipal wastewater where the actual ratio of biodegradable carbon to average flow conditions is normal, all wastewater is also processed through the equalization/fermentor SBR so as to enhance the VFAs production from the organic matter (soluble and particular) present in the wastewater. The fact that all the organic loads are processed through fermentation enhances the VFAs production significantly as all the soluble and non-settleable particulate carbon loads are available for fermentation. But, considering the important municipal peak daily flow during which the carbon load becomes very diluted, for example on rainy days, it is no longer practical to match the hydraulic retention time of the fermentation process with the one of the hydraulic equalization. This becomes particularly true when significant peak flows (typically of 3–5 times the average flow) are encountered. In such cases, the biodegradable carbon concentration included in the wastewater becomes very low as does the actual phosphorus concentration. All loads are then very diluted, such as by a factor of 3–5 times in which case the total phosphorus concentration in the influent wastewater will be much reduced at average flow conditions. Under such operating conditions only, the present invention comprises additional steps calling for the following operation mode:

all flow of wastewater can continue to enter the equalization/fermentor, the first SBR which is designed as a primary clarifier so as to settle most of the settleable solids for their fermentation into volatile fatty acid. As mentioned hereinbefore, these volatile fatty acid compounds are very valuable to obtain the best possible biological phosphorus removal later on in the second SBR. As illustrated in FIG. 1, when the ultimate hydraulic equalization capacity of the fermentor/equalization SBR is reached, the diluted excess incoming wastewater (41) is then automatically bypassed away from the fermentor/equalization SBR (10) and directed towards the second SBR (12) which then starts to operate as a "gradual-fill SBR system" for that portion of the flow. Such a bypass of rain/infiltration water is necessary so that heavy hydraulic peak flows do not upset the hydraulic operation of the fermentor/equalization.

Under these conditions, the actual phosphorus concentration is again very diluted and such minor quantities of P will be removed directly by normal mechanisms of phosphorus removal in the second SBR (12) so that the performance of the overall system remains within the acceptable limits of phosphorus elimination.

So, under normal conditions/applications, this invention clearly presents a unique aspect as all the wastewater, not only primary sludge, is fermented in the first SBR (10) with the purpose of maximizing VFAs presence during the initial anaerobic period of the second SBR (12) for optimum storage by the phosphorus removal biomass.

Additional VFAs can then be produced by fermenting the whole wastewater content, including the soluble COD fraction present in the wastewater. The prior art that only preferments the COD fraction included in the settleable solids does not benefit from this additional organic fraction which is in fact more easily biodegradable and transformable into VFAs.

1.2 Prefermenter Functions

According to the present invention, the fermenting functions are matched and combined with the equalization functions so that both these needs can be satisfied over the total influent hydraulic variation range of the plant.

The fermentation reaction deals first with the conversion of carbonaceous organic matter (soluble and particulate BOD and COD) into VFAs, such as acetate, propionate, butyrate, valerate, etc. This first conversion of the organic compounds is realized by a fermenting biomass that is allowed to grow anaerobically in the first SBR (10). This first conversion is a key factor to optimize biological phosphorus removal. It must be well controlled as well as maximized in every way as the eventual biological phosphorus removal efficiency will directly depend upon the efficiency of this initial reaction as we will more fully explain later.

The amount of VFAs generated from carbonaceous compounds (soluble and particulate) must be generated from a wastewater stream containing a sufficient amount of biodegradable BOD. Experiments have shown very little fermentation/biological phosphorus removal when insufficient biodegradable matter was present. In this sense, the ratio of BOD over phosphorus content in the wastewater must, preferably, be at least in the range of 25 to 1 as reported by previous studies.

Preferably, the sizing of the fermenter reactor or first SBR (10), allows for a retention time ranging from 4 to 12 hours based on daily average flow. At a size corresponding to 4 hours HRT (hydraulic retention time), adequate fermentation occurred if the fermentative biomass concentration was high enough, e.g. if enough fermentative bacteria were present. High concentrations of fermenting biomass in the range of 10,000 mg/l does not upset the sedimentation process as such biomasses have shown very good settling properties as well as very low SVI values (40–80 ml/g). Although a plant can be operated in such conditions, the preferred range of operation is of 8 to 12 hours HRT so that more reliable and stable performances are achieved regardless of variations in influent characteristics, temperature, pH, flow, settleable solids, etc. With regards to fermenting biomass (under flocculated particulate form or dispersed bacterial form), the present invention preferably controls the efficiency of separation within the first SBR (10) since such a biomass is mostly of the "facultative type", e.g. it can live under aerobic and anaerobic environmental conditions. If large amounts of such a fermenting biomass are transferred to the second SBR (12), the settleability of the biomass in the second SBR (12) will become affected.

Anaerobic digestion consists of acidogenesis and methanogenesis. During acidogenesis, only a transformation of organic takes place. The carbon load is little reduced so that the BOD and COD loads remain practically unchanged compared to that of the influent, unless nitrate or sulfate are present in the influent, in which case denitrification or sulfate reduction would consume some COD. During the second part of the anaerobic digestion, i.e. the methanogenesis, methanogenic bacteria use the acid hydrogen gas as a source of food and energy, thereby producing methane gas. As a result, the carbonaceous load of the wastewater is reduced. Again, in dealing with biological phosphorus removal, the methanogenic phase of the anaerobic digestion must be well controlled and minimized.

Anaerobic mixing is also part of the first SBR (10). It is used to provide the necessary contact between the fermenting biomass and the carbonaceous load of the influent wastewater. This mixing can be achieved using hydraulic jet mixer (18) as illustrated in FIG. 1, a mechanical downflow, horizontal turbine mixer or any other type of hydraulic circulation means that exclude air/oxygen introduction in the liquid. The influent wastewater (14) is pretreated by separate batches in the first SBR (10). Each anaerobic batch treatment is controlled, preferably by a logic controller, in terms of active mixing period and biomass gravity separation by an internal physical sedimentation process prior to the "rapid-feeding" of each so pretreated batches to the second SBR (12).

The first SBR (10) is sized and operated to generate sufficient culture of fermenting biomass. Such biomass has an equivalent growth factor comparable to or less than the aerobic biomass. Experiments have shown a specific growth coefficient of about 0.4 g of VSS (volatile suspended solid) per g of COD, and 0.25 g of VSS per g of COD transformed into VFAs. Consequently, an excess of fermenting biomass may be produced in the first SBR (10) and the sludge retention time (sludge age) must be controlled to avoid wasting the excess fermenting biomass into the second SBR (12). The sludge age control can be obtained using a transfer device (50) such as a pump or airlift-pump during a mix phase or a settling phase of the anaerobic treatment sequence. The excess of fermenting biomass (52) is to be preferably transferred into a small aerated sludge holding tank (25) before being mixed and/or thickened in contact with the wasted phosphorus-rich sludge from the second SBR (12). Aeration of the fermenting biomass will result in the consumption of the VFAs and will minimize phosphorus resolubilization when eventually mixed with the phosphorus-rich sludge of the second SBR (12) during the sludge treatment processes.

1.3 Odor control

Finally, it has been observed that some of the fermenting products can be malodorous. To minimize this problem, the first SBR (10) can normally be operated under a sealed anaerobic atmosphere so that the water level can fluctuate. Because of the air/gas circulation in and out of the fermenter, it is preferable to control odors. The source of odor has been traced to $H_2S$, mercaptans and VFAs. Methanogenic and sulfate-reducing bacteria are strict anaerobes. Thus, three preferred ways of controlling odors can be used:

Intermittent oxygenation of the fermenter liquor in the first SBR (10)

As the odor generating bacteria are strict anaerobes, short periods of oxygenation can be intermittently provided in the treatment sequence of the first SBR (10). If the whole process is governed by a programmable logic control system, this operation is easily adjustable so that the efficiency of the fermenter does not suffer from aeration. The aerated period can be as little as 5 minutes per day so that the growth of these odor generating bacteria is periodically discouraged. These short aeration periods will also eliminate the methanogenesis process in order to avoid the VFAs to be utilized by the methane bacteria. Therefore, a higher efficiency of fermentation can be obtained.

Negative gas suction (54) from the top part of the first SBR (10)

Such negative gas suction can be realized by an air blower or preferably by an ejector pump connected to a self-aspirating jet. In both cases, the odorant organic gas can be injected in the air diffusion system of the second SBR so that the organic gas can be efficiently absorbed by the mixed liquor.

Gas biofiltration

This third solution to the odor problem simply consists in extending a vent pipe from the top part of the first SBR (10) to transfer the odorous gas into a biological filtration system designed for odor control. In this solution, the gas is distributed at the bottom of a biofilter filled with absorbent media such as bark particles, large peat moss pieces, etc. The gas is allowed to rise through the media. This media is kept wet by periodically irrigating its surface using a sprinkler device fed by the final effluent of the sewage treatment plant.

2. Second SBR

The second SBR (12) is mounted in series with the first reactor (10). Its operation is particular to the present invention and its sequence of operation is engineered on the basis of the previous biological fermentation achieved in the first SBR (10) and of an advanced understanding of the biological phosphorus removal techniques.

The second SBR (12) has all the advantages of a "rapid-fill" SBR. The prefermented water is transferred rapidly, preferably in 15 to 60 minutes, into the second SBR (12) by gravity (17), as illustrated in FIG. 2, or by using a feed pump (16), as illustrated in FIG. 1.

Several other advantages are achieved by selecting the technique and operation of the second SBR (12) in which a second and final treatment step of the present invention is carried out. These advantages are detailed in the following sub-sections 2.1 to 2.7.

2.1 Perfect control over the period of time required for each reaction and physical steps of a given treatment sequence As the process according to the invention is an advanced treatment process, the SBR basic and already known techniques become of the utmost importance as this process necessitates a great amount of precision to control each of the several biological reactions that must occur in a complete way. Moreover, many of these reactions are occurring in series one after the other and must be initiated in the proper order of priority. By selecting proper sequencing batch reactor operation techniques and by feeding the second SBR (12) in "rapid-fill/full-batch mode" from the first SBR (10), the process according to the invention allows to recover precious time and allows to control the succession of advanced treatment reactions.

2.2 Control over suspended solids in the treated effluent

In order to achieve the requested advanced treatment performances, the process according to the invention incorporates powerful control over the biomass characteristics so that the concentration of suspended solids left in the treated effluent is kept to a very minimum. The process according to the present invention allows such effluent quality to become stable and achievable on a permanent basis. By operating the second SBR (12) in a "rapid feed mode", the invention results in the development and use of a powerful biological selective effect which results in controlling the growth of the two major types of bacteria composing the active biomass in terms of only active bacteria participating in the reduction of the organic loads. These two types are hereby called "floc-forming bacteria" and "filamentous bacteria". At this time, we wish to identify and exclude other superior microorganisms from the biomass hereby called "predators" which feed on bacteria, biopolymers and biomass debris. These superior microorganisms do not participate in the reduction of the organic loads as such. In other words, they do not use the soluble organic pollutants of the wastewater as their major source of food.

This biological selective effect relates to specific conditions that encourage one type of bacteria to grow much faster than the other one. In that sense, control over the suspended solids calls for a selective effect that encourages the "floc-forming bacteria" to grow much faster than the "filamentous bacteria". To better understand the selective effect mechanism of the present invention, one must realize that the "floc-forming bacteria" are physically small in comparison with the "filamentous bacteria" that can be described as long, hairy-looking filaments. These filamentous bacteria therefore benefit from an obvious advantage over the floc-forming bacteria due to their unique geometry which allows them to have a much larger surface contact with the wastewater and its organic soluble content during a given reaction cycle in the second SBR (12). This more effective contact with the food promotes their faster growth rate as they have no problem feeding under all conditions, including the good ones and the bad ones. The good conditions correspond to conditions where the food is well balanced in terms of the presence of nutrients and the quantity of food available through the whole reaction period. Whenever the food conditions are not perfectly balanced (ex: a lack of a nutrient) or whenever the food is getting rare at the end of the treatment cycle, then the filamentous bacteria have the capacity to continue feeding sufficiently while the "floc-forming bacteria" are starving for food and/or cannot grow at their normal rate. Consequently, under such conditions, filament-bacteria will simply "overgrow" the floc-forming bacteria in a given biomass present in a reactor. The presence of excess filamentous bacteria greatly interferes with the floc formation of the global biomass and imposes a detrimental and slow sedimentation effect and permanent suspension of sheared floc particles which prohibits effective massive gravity settling and separation from the clear water.

By using the second SBR (12) in a "rapid-feed mode", the process according to the invention provides ideal conditions so that the "floc-forming bacteria" have no problem in feeding at the beginning of each treatment cycle, just after the introduction of a great amount of organics contained in every "full batch" of fermented wastewater. Under such conditions, the soluble BOD concentration is at its highest level.

By experience, filaments are present in most of the reactors, particularly the ones treating domestic wastewater. Controlling their growth rate is therefore very important and is part of the state-of-the-art bio-engineering of SBRs. Ideally, the floc-forming bacteria will use the filament structure to even grow over the filaments in order to form larger flocs which can settle better. This state-of-the-art flocculation technique also uses flocculated biomass to form a filtering effect as the floc blanket starts to settle down, entraining all fine particles of dispersed floc, leaving behind very clear treated water. This is the desired result of a well controlled biological selector effect and it can offer higher overall treatment performances since the suspended solids are composed of carbonaceous organics as well as nitrogen and phosphorus material.

2.3 Enhanced kinetics due to rapid-feed mode

Various types of bacteria show different rates for absorbing food as a function of the actual food concentration available to them at any given time or during a given treatment cycle.

Continuous flow systems, such as conventional activated sludge, are continuously operating within a limiting capacity of absorption of the biomass. This capacity of treatment is related to a certain fraction of their maximum absorption rate (kmax). In other words, such conventional systems do not make full use of the treatment capacity of a given biomass in a reactor.

The process according to the invention, by providing a "rapid-feed" mode of the wastewater at the beginning of each treatment cycle, provides the necessary conditions for allowing bacteria to operate at near their maximum rate for a significant part of the reaction period where the soluble organics are in high concentration. By absorbing the organics faster, valuable time and treatment capacity are gained. In many cases, such a gain translates into doubling the treatment capacity of a given reactor, provided enough oxygen is available for the biological reactions.

2.4 Additional treatment capacity due to the enhanced absorption rate of the organics generated by a prefermentation stage The process according to the invention uses an anaerobic pretreatment of the organics through a fermentation process in the first SBR (10) where the normal complex organic compounds (soluble and particulate) are transformed into VFAs by a fermenting biomass. These VFAs can be described as the most readily available organic forms of food for further biological absorption by the biomass included in the second SBR (12). This form of food is so favorable that it requires less oxygen and less energy from the heterotrophic bacteria for its absorption. Therefore, the absorption rate of the organics is greatly improved when compared to the absorption rate of normal carbonaceous complex organics.

2.5 Energy savings due to enhanced kinetics and an enhanced absorption rate

By providing a maximum amount of food in the form of fermented organics to the biomass in the second SBR at the beginning of each cycle, several bacterial metabolic functions are facilitated, requesting a smaller amount of oxygen for the biological reaction of absorption. The process according to the invention permits to save as much as 20% of the normal oxygen requirement, reducing proportionally the power consumption.

2.6 Gains in treatment capabilities

In the same way, due to the enhanced biological kinetic absorption rate of the organics and the rapid introduction of each batch of wastewater at the beginning of a treatment cycle, a significant time reduction is achieved to treat a given amount of pollutants. This gain in time directly translates into substantial gains in the treatment capabilities of a given wastewater treatment plant.

2.7 Improved static sedimentation of the biomass

At the end of each biological reaction period, the mechanical operations of the aeration and mixing devices are interrupted, turning the whole reactor into an oversized clarification zone. Under such conditions, no upward water current is generated and the flocculated solids are encouraged to settle by gravity. Such a hydraulic sedimentation condition is ideal to provide improved water quality with very little suspended solids in the treated effluent.

3. Control over biological reactions

Several biological reactions occur one after the other in each of the treatment sequences. Some of these reactions are occurring in a certain natural priority order. Some other reactions are controlled by an engineered sequence so that they do not interfere with the efficiency of other important reactions and result in greater treatment performances. The main reactions can be described as follows.

3.1 Carbonaceous load removal

Whenever the main pollutant load is due to the presence of carbonaceous material, heterotrophic bacteria will naturally be the predominant genus of microorganisms. These bacteria, by the importance of their population versus the other bacteria genus, will exercise a first priority order to absorb the organics as expressed in terms of biodegradable COD. In this case, an extended period of time during each treatment cycle will be mainly utilized for carbonaceous load removal.

3.2 Ammonia load removal

Nitrogen is found under several forms in the wastewater. One part is organic and not directly available to the biomass. It must therefore be transformed into ammonia ($N-NH_4$) by hydrolyses so that it can be used by microorganisms as a primary nutrient. It is also under this ammoniacal form that nitrification of the excess $N-NH_4$ will occur. Nitrification is realized by aerobically transforming the $NH_4^+$ into $NO_2^-$ and then, from $NO_2-$ to $NO_3^-$. Two different bacteria are mainly responsible for this transformation, Nitrosomas and Nitrobacter. Nitrification naturally occurs when the carbonaceous load is significantly decreased, allowing the autotrophic bacteria to compete for ammonia and oxygen. Their source of carbon for growth is $CO_2$ (or $HCO_3^-$).

In advanced treatment processes such as the process according to the invention, most of the time, nitrification is desired even if it cannot be considered as an effective controlling element for eutrophication of the water. In addition, nitrification usually cannot be avoided under the treatment conditions due to the necessity to operate under high sludge condition ages (8 to 20 days, preferably around 15 days) along with acceptable conditions of temperature, pH, alkalinity, etc. In many cases, nitrification is requested so that the ammonia concentration is reduced sufficiently to avoid effluent toxicity to certain sensitive water streams.

3.3 Nitrogen load removal

As nitrification in advanced treatment is likely to occur for the reasons stated above, the presence of nitrate becomes of concern when dealing with advanced treatment, particularly when biological phosphorus removal must be promoted and controlled scientifically.

Denitrifying these nitrates involves the use of a population of denitrifying bacteria which are active during an anoxic period of the sequence, meaning an absence of free dissolved oxygen but presence of nitrate in the mixed liquor. Under these conditions, the preferred source of oxygen will be the nitrate that will be used as electron acceptors by these bacteria instead of oxygen for energy generation. Nitrogen gas will be liberated in the atmosphere or dissolved into the water.

The major advantage of denitrification is that it results in a higher quality of treated water (free of $NO_3^-$ nutrient), the recovery of about half of the alkalinity consumed during nitrification (reducing the need to control the pH during the process) and finally, a significant recovery of the energy spent for aeration for the nitrification process (about 33%).

As it will be seen later, denitrification is a necessary process to minimize bacterial competition for VFAs at the early stage of the biological phosphorus removal period. This competition is caused by the fact that the denitrifying bacteria are classified into two different categories. The first category includes the standard heterotrophic bacteria with primary affinity toward carbonaceous organics such as biodegradable COD compounds and particularly easily biodegradable preferemented organics such as the VFAs (acetate, propionate and butyrate). Consequently, if nitrates are still present at the beginning of the anaerobic period (following the anoxic period of the treatment cycle), these denitrifying bacteria will play an important role in consuming these more easily biodegradable compounds, resulting in a direct reduction in the performance capabilities of biological phosphorus removal of the treatment plant. This first type of denitrifiers will consume fatty acids but will not store them for subsequent biological phosphorus absorption.

The other category of denitrifying bacteria is identified as "phosphorus removing bacteria". Its population is not as easily predictable as compared to standard heterotrophic ones. Therefore, well controlled denitrification is strongly recommended when advanced biological phosphorus removal is the treatment objective.

3.4 Biological phosphorus removal

This reaction is of the utmost importance and is the main objective of the present invention. The process according to the invention has been designed and experimented to provide superior phosphorus removal in a simple and controllable manner. This process recognizes the fundamental importance of maximization of the VFAs generation in the fermentation stage of the biological process, e.g. in the first SBR reactor (10). Here, all organic loads (soluble and particulate) are allowed to be prefermented in an equalization basin (the first SBR) where fermenting biomass is allowed to develop in a "controlled way". By "controlled way", it is meant a combined equalization/fermenter reactor being operated using sequencing batch reactor techniques so that every aspect of the anaerobic reactions can be controlled "in-time" and also preferably with regards to the sludge age and the hydraulic retention time and in view of the carbonaceous content of the wastewater. Such a sequential operation of the anaerobic reactor (first SBR (10)) is used to maximize the production of VFAs to increase, in a proportional manner, the treatment capacity of the process in terms of biological phosphorus removal at a further stage, i.e. in the second SBR (12).

Once these VFAs are generated, the process according to the invention allows to preserve them for the almost exclusive consumption by the phosphorus removing bacteria. The process according to the invention allows to specifically control each of these reactions to meet the desired treatment performances in terms of nutrient removal, and especially phosphorus removal to levels preferably equal to or less than 0.5 mg/l of phosphorus.

Biological phosphorus removal is due to the absorption of phosphorus beyond the normal metabolic needs of the bio-p bacteria. Such excessive absorption is due to the early storage of the VFAs achieved during the initial anaerobic period of the second SBR. At this point in time, the VFAs are not being absorbed and consumed as an energy source. They are simply stored inside the cell as a reserve of "select food" or bacterial fats. This technological breakthrough is already known in the art and can be better explained nowadays. This first important reaction occurs without any energy generation from aerobic respiration. On the contrary, this first reaction uses intracellular polyphosphates and glycogen as source of energy for the bio-p bacteria. This results in the degradation of polyphosphate reserves and the release of phosphate into the mixed liquor. Under subsequent aerobic conditions, bio-p bacteria will eventually store more phosphorus than it releases for VFAs storage. Therefore, acclimatization of the biological phosphorus biomass is required to obtain an operating equilibrium. From there, the reaction can be considered relatively stable under given conditions.

In the process of the present invention, once the biological phosphorus removal biomass has stored a maximum amount of VFAs in its cells, the actual biological phosphorus removal capacity of the system is established and can be calculated. Then, at this time only, can the aerobic conditions be activated to allow the biological phosphorus removal biomass to actually consume their VFAs storage as a preferential source of energy under these timed conditions. While consuming this reserve of energy, bio-p bacteria will accumulate in a proportional way, a quantity of orthophosphate contained in the mixed liquor in the form of intracellular polyphosphates. In this way, a high degree of biological phosphorus removal can be achieved.

4. Maintaining the Initial Phosphorus Removal Capacity of the Biological System 4.1 Sludge wastage during the aerated periods Once the maximum biological phosphorus removal capacity of the system is optimized and realized, the initial removal efficiency must be maintained until the phosphorus is well secured under manageable form, i.e. stored in the dewatered excess sludge produced by the treatment system. In order to achieve this goal, the excess biomass in the form of a phosphorus-rich sludge under aerobic conditions is removed at the end of the aerated sequence of the treatment cycle in the second SBR. By doing so, maximum aerobic conditions are present in the mixed liquor and in the biomass at the time of removing the phosphorus-rich sludge from the second SBR (12). Such oxygenation conditions are much more preferable to sludge wastage under anoxic or anaerobic conditions in order to avoid resolubilization of phosphorus in solution. Similarly, any endogenous conditions of the biomass are also likely to promote gradual solubilization of phosphorus in solution, particularly if these conditions occur during the absence of oxygen (as the phosphorus release is accelerated under anaerobic conditions).

Regardless of the above conditions, resolubilization of phosphorus will also occur if the excess biomass is digested in any manner (aerobically or anaerobically), particularly if digested anaerobically.

In order to minimize the release of phosphorus in solution to its strict minimum, the invention uses a specific time (end of reaction period) to remove the excess of phosphorus-rich biomass under complete mixed/oxygenated conditions. More particularly, the process according to the invention does not wait for the sludge containing the biomass to settle down during the sedimentation/separation process in order to maximize its oxygen content to best control any phosphorus release. The phosphorus-rich biosolids are removed at a concentration equal to that of the mixed liquor. This procedure allows to control more precisely and in a permanent way, the constitution of the biomass in terms of the desirable populations of bacteria. Wasting the sludge under mixed conditions allows for a perfect control over the hydraulic retention time of the biomass itself (sludge age) regardless of variations in biomass concentrations and compaction characteristics during the sedimentation process. Such operation of the process according to the invention allows to achieve permanent, controllable and higher phosphorus removal performances.

4.2 Immediate biomass separation

As illustrated in FIGS. 1 and 2, once the excess phosphorus-rich sludge has been removed from the second SBR (12) using the above procedures, this phosphorus-rich sludge (20) can immediately be separated using a special micronic filtration process (25) in order to readily thicken the sludge to concentrations ranging between 2 and 4%, depending on the actual sludge conditions and the dosage of polymer solution or not. The thickened sludge (27) is then transferred into a small storage tank (28) and fed via a variable flow sludge pump (29) into a final sludge dewatering apparatus 30.

Such instantaneous sludge separation and thickening under aerobic conditions maintains all the phosphorus content of the biomass within the biological solids. Moreover, polymer dosage at this stage is not necessary as the sludge is not digested and contains an important quantity of biopolymers that effectively enhance solids separation.

Preferably, to minimize the size and cost of the micronic belt filter, the sludge wasting period can be extended from 30 to 60 minutes without affecting the process. Preferably, use can be made of a micronic belt filter apparatus having an integrated belt washing system using air as a cleaning media instead of water. This apparatus is capable of capturing over 95% of the biological solids without the use of polymers. No phosphorus resolubilization should occur since an aerobic washing system is used, which boosts the oxygenation at the final stage prior to dewatering. Also, no water is used to carry away eventual solubilized phosphorus.

Preferably, a logic controller controls the operation of the sludge wasting, sludge separation and sludge storage time prior to dewatering in order to minimize any phosphorus release.

Results from a research project conducted according to the present invention

The following table is the average performance of a pilot-scale first SBR treating an industrial milk plant effluent.

|  | | INFLUENT | | FERMENTED EFFLUENT | |
|---|---|---|---|---|---|
|  | Units | average | std dev | average | std dev |
| pH |  | 11,8 | 0,1 | 6,7 | 0,1 |
| $COD_{tot}$ | mg/L | 3002 | 1026 | 2496 | 875 |
| $COD_{Filt}$ | mg/L | 2183 | 766 | 1604 | 429 |
| $BOD_5/COD$ | mg/mg | 0,36 | 0,04 | — | — |
| VFA | mg/DCO/L | — | — | 1053 | 321 |
| Conversion | % | — | — | 36 | 5 |
| $VFA/COD_{Filt}$ | % | — | — | 65 | 6 |
| SS | mg/L | 535 | 134 | 610 | 611 |
| VSS/SS | mg/mg | 0,60 | 0,09 | 0,81 | 0,04 |
| TP | mg P/L | 63 | 11 | 63 | 14 |
| $o-PO_4^-$ | mg P/L | 16 | 5 | 50 | 6 |
| TKN | mg N/L | 67 | 26 | 76 | 40 |
| $NH_4^+$ | mg N/L | 0,7 | 0,5 | 29 | 10 |
| $NO_3^-$ | mg N/L | 37 | 6 | <0,1 | — |

Figure 4:
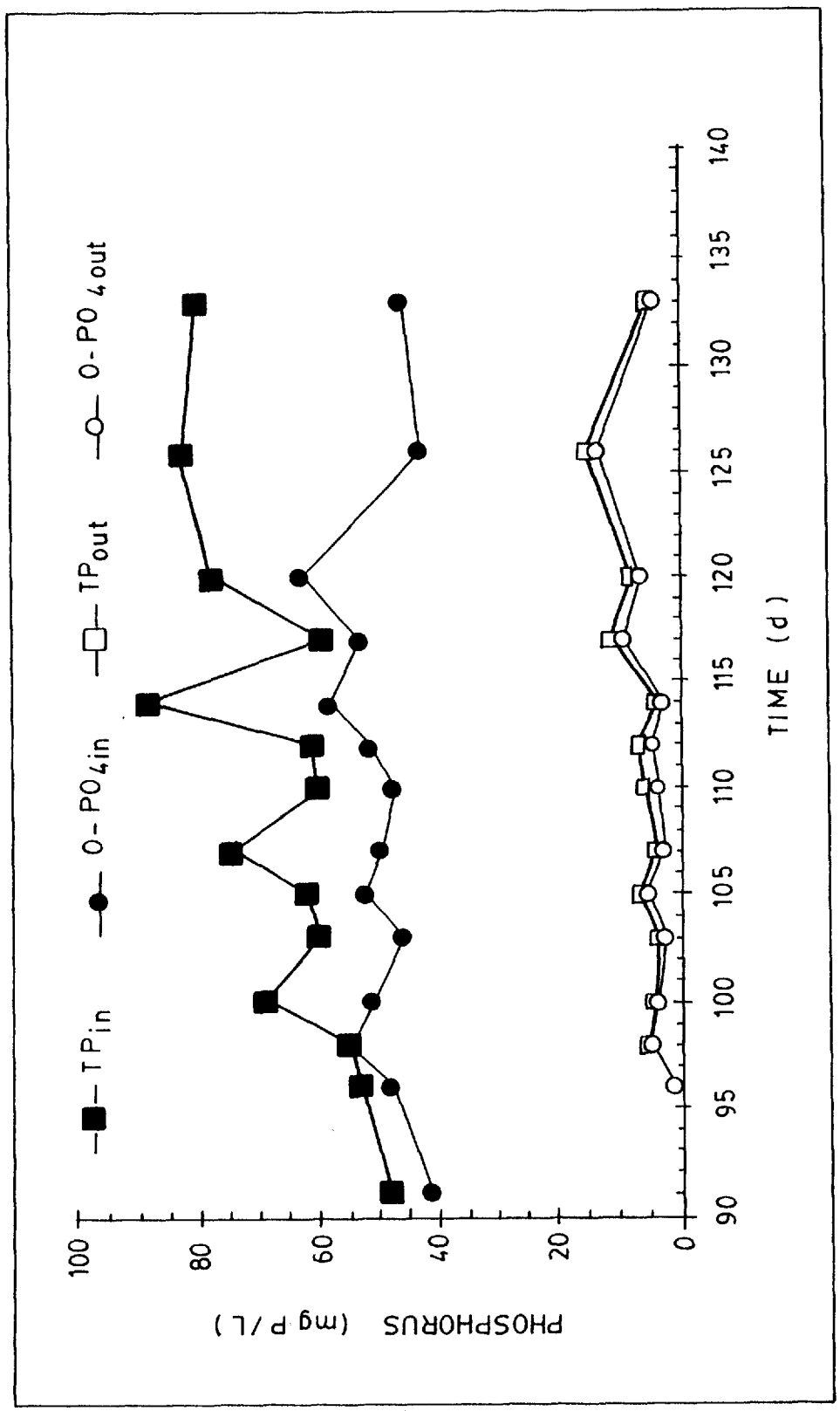
FIG. 4 is a plot diagram showing the phosphorus removal performance by a pilot-scale second SBR treating a fermented industrial milk plant effluent.
Figure 5:
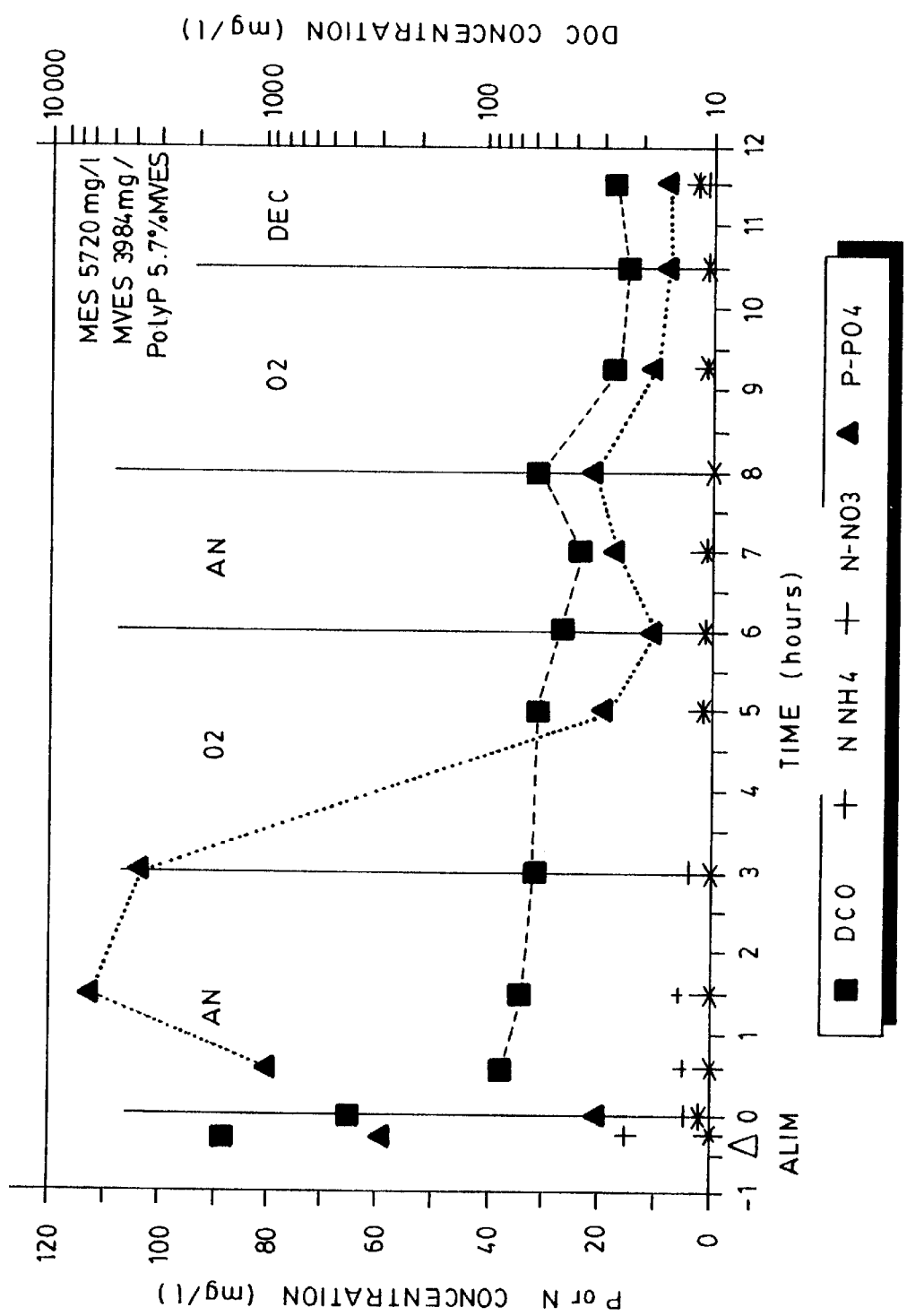
FIG. 5 is a plot diagram showing the evolution of the phosphorus concentration in the water of a second SBR according to the present invention.

FIGS. 4 to 6 are showing the results obtained from the same research project conducted in the field of industrial wastewater treatment. More particularly, the object of this research project was to treat an industrial milk plant effluent according to the present invention.

These results show the efficiency of the process to treat wastewater in order to greatly lower the phosphorus concentration of the treated effluent.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. A biological process for treating wastewater having a ratio of biodegradable BOD loads to phosphorus in solution at least equal to 25/1, in order to remove said phosphorus and thus obtain clarified water, said process using at least two sequencing batch reactors (SBR) filled with a sludge-mixed liquor and comprising the steps of:

a) continuously feeding said wastewater into a first (SBR) operating under anaerobic conditions;

b) in said first SBR,
  i) equalizing and anaerobically mixing the wastewater;
  ii) controlling in-time any fermentation reaction occurring therein in order to produce and maximize an acidogenesis fermenting phase of organic materials and prevent a methanogenesis fermenting phase thereof;

c) rapidly transferring the wastewater from the first SBR to a second SBR;

d) in said second SBR,
  i) anaerobically treating the waste water from the first SBR in order to store a maximum amount of volatile fatty acids (VFAs) within a phosphorus removal biomass;
  ii) mixing and aerating the wastewater, such aerating causing the phosphorus removal biomass to rapidly consume the volatile fatty acids stored therein and to absorb the phosphorus in solution in the wastewater, thereby producing a phosphorus-rich sludge-mixed liquor;
  iii) removing a given amount of the phosphorus-rich sludge-mixed liquor from the second SBR under oxygenated conditions to avoid resolubilization of the phosphorus in the water;
  iv) allowing the sludge remaining in the second SBR to settle, thereby causing formation of an upper layer of clarified water; and
  v) decanting the upper layer of clarified water formed above the liquor after the settling period (iv), said clarified water containing a low concentration of phosphorus.

2. The process of claim 1, comprising the additional step of:

b) iii) allowing the sludge to settle in the first SBR before transferring the wastewater to the second SBR.

3. The process of claim 1, comprising the additional step of:

e) filtering under aerobic conditions the removed sludge-mixed liquor by using a micronic filtration process to obtain a filtrate and a thickened sludge.

4. The process of claim 3, comprising the additional step of:

f) feeding the filtrate to the first SBR.

5. The process of claim 4, comprising the additional step of:

g) treating the thickened sludge in an aerated sludge holding tank.

6. The process of claim 5 comprising the additional step of:

h) dewatering the treated sludge.

7. The process of claim 1, wherein the first SBR is sized to provide 2 to 24 hours of hydraulic retention time (HRT).

8. The process of claim 7, wherein the first SBR is sized to provide 6 to 15 hours of HRT.

9. The process of claim 1, comprising the additional step of:

transferring from the first SBR a given amount of sludge containing an excess of fermentative biomass to an aerated digester.

10. The process of claim 1, comprising the additional step of controlling odors in the first SBR.

11. The process of claim 10, wherein the step of odors controlling is achieved by intermittently introducing oxygen or air in the first SBR for less than five minutes per day.

12. A biological process for treating wastewater having a ratio of biodegradable BOD loads to phosphorus in solution at least equal to 25/1, in order to remove said phosphorus and thus obtain clarified water, said process using two sequencing batch reactor (SBR) filled with a sludge-mixed liquor and comprising the steps of:

a) continuously feeding said wastewater into a first (SBR) sized to provide 2 to 24 hours of hydraulic retention time and operating under anaerobic conditions;

b) in said first SBR,
  i) equalizing and anaerobically mixing the wastewater;
  ii) controlling in-time any fermentation reaction occurring therein in order to produce an acidogenesis fermenting phase of organic materials and prevent a methanogenesis fermenting phase thereof;
  iii) allowing the sludge to settle in the first SBR;
  iv) controlling odors by intermittently introducing oxygen or air in the first SBR for less than five minutes per day;

c) rapidly transferring the wastewater from the first SBR to a second SBR;

d) in said second SBR,
  i) anaerobically treating the waste water from the first SBR in order to store a maximum amount of volatile fatty acids within a phosphorus removal biomass;
  ii) mixing and aerating the wastewater, such aerating causing the phosphorus removal biomass to rapidly consume the volatile fatty acids stored therein and to absorb the phosphorus in solution in the wastewater, thereby producing a phosphorus-rich sludge-mixed liquor;
  iii) removing the phosphorus-rich sludge-mixed liquor from the second SBR under oxygenated conditions to avoid resolubilization of the phosphorus in the water;
  iv) allowing the sludge remaining in the liquor to settle, thereby causing formation of an upper layer of clarified water; and
  v) decanting the upper layer of clarified water formed above the liquor after the settling period (iv);

e) filtering the removed sludge-mixed liquor by using a micronic filtration process to obtain a filtrate and a thickened sludge;

f) adding said filtrate to the first SBR;

g) treating the thickened sludge in an aerated sludge holding tank;

h) removing water from said treated sludge; and i) transferring said water obtain in step (h) into the first SBR.

* * * * *